(12) United States Patent
Perets

(10) Patent No.: US 6,985,709 B2
(45) Date of Patent: Jan. 10, 2006

(54) NOISE DEPENDENT FILTER

(75) Inventor: Yoni Perets, Petach-Tikva (IL)

(73) Assignee: Intel Corporation, Santa Clara, CA (US)

( * ) Notice: Subject to any disclaimer, the term of this patent is extended or adjusted under 35 U.S.C. 154(b) by 721 days.

(21) Appl. No.: 09/887,595

(22) Filed: Jun. 22, 2001

(65) Prior Publication Data
US 2003/0003889 A1 Jan. 2, 2003

(51) Int. Cl.
H04B 7/00 (2006.01)

(52) U.S. Cl. ............... 455/266; 455/63.1; 455/114.2; 455/278.1; 455/296; 455/339

(58) Field of Classification Search ............ 379/416, 379/417; 455/63.1, 114.2, 278.1, 296, 339, 455/266, 306
See application file for complete search history.

(56) References Cited

U.S. PATENT DOCUMENTS

| 4,628,529 | A | * | 12/1986 | Borth et al. .............. 381/94.3 |
| 5,493,717 | A | | 2/1996 | Schwarz .................... 455/306 |
| 5,715,282 | A | | 2/1998 | Mansouri et al. ......... 375/350 |
| 6,031,866 | A | | 2/2000 | Oler et al. ................ 375/219 |
| 6,032,114 | A | * | 2/2000 | Chan ........................ 704/226 |
| 6,047,171 | A | * | 4/2000 | Khayrallah et al. ....... 455/266 |
| 6,061,649 | A | * | 5/2000 | Oikawa et al. ............ 704/226 |
| 6,122,309 | A | | 9/2000 | Bergstrom et al. ........ 375/130 |
| 6,477,489 | B1 | * | 11/2002 | Lockwood et al. ....... 704/200.1 |

FOREIGN PATENT DOCUMENTS

EP 0542520 3/1997

* cited by examiner

Primary Examiner—Bing Q. Bui
(74) Attorney, Agent, or Firm—Schwegman, Lundberg, Woessner & Kluth, P.A.

(57) ABSTRACT

A communication device includes a noise flattening filter having a filter response that dynamically adjusts based on the current noise spectrum in a wireless channel. The noise spectrum of the wireless channel is estimated and used to determine a noise classification for the channel. A noise flattening filter response is then selected based upon the noise classification for use in filtering signals received from the channel. The filtered signals are then delivered to an equalizer for further processing.

23 Claims, 3 Drawing Sheets

NOISE DEPENDENT FILTER

FIELD OF THE INVENTION

The invention relates generally to communication systems and, more particularly, to structures and techniques for filtering signals within such systems.

BACKGROUND OF THE INVENTION

Wireless communication systems commonly employ equalizers to handle undesired channel effects from received signals. These equalizers typically assume that white Gaussian noise exists in the channel. This assumption, however, is often inaccurate. That is, in many cases, the noise in the channel derives from various different sources (e.g., co-channel noise, adjacent channel noise, thermal noise, etc.) so that the overall noise spectrum is not white. An equalizer that assumes white noise, therefore, will not produce optimal results.

DETAILED DESCRIPTION

Figure 1:
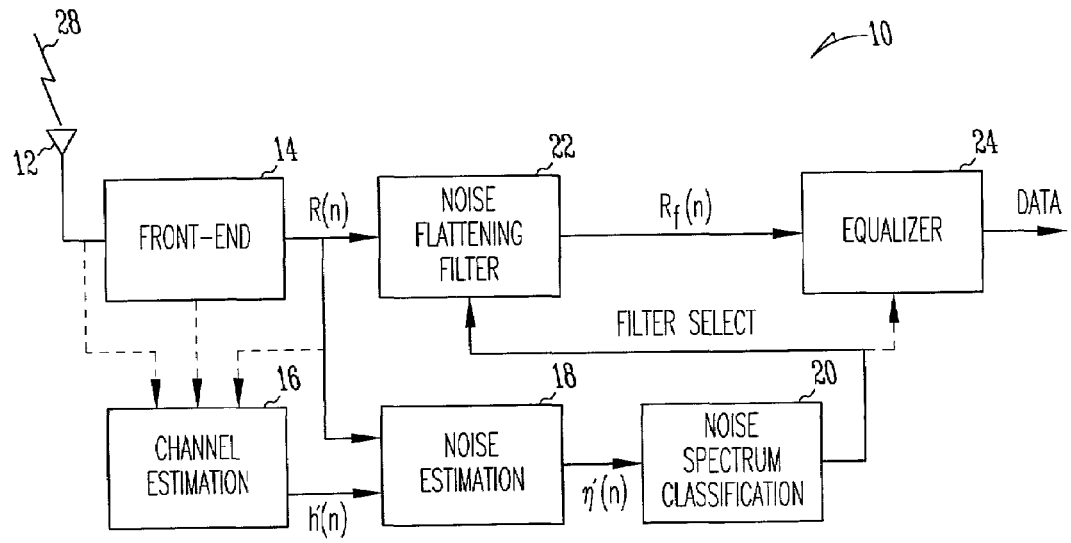
FIG. 1 is a block diagram illustrating a receiver system in accordance with one embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to an adaptive noise filtration technique and apparatus for use within a wireless communication system. A noise flattening filter is provided to process a signal received from a wireless communication channel before the signal is equalized. During system operation, the transfer function of the noise flattening filter is dynamically adjusted based upon the present noise spectrum of the channel. For example, if the noise within the channel is concentrated toward the higher frequencies, a low pass filter response can be selected. Similarly, if the noise within the channel is concentrated toward the lower frequencies, a high pass filter response can be chosen. In this manner, the noise component within the received signal is "whitened" and the accuracy of the equalization operation is enhanced. The inventive principles can be used in any communication system using an equalization scheme that assumes white noise within a received signal (e.g., decision feedback equalization, maximum likelihood equalization, etc.). The inventive principles can be implemented in both mobile communication devices (e.g., a handheld communicator) and stationary communication devices (e.g., base station equipment). The inventive principles can also be used within communication devices utilizing software-defined radio (SDR) techniques.

FIG. 1 is a block diagram illustrating a receiver system 10 in accordance with one embodiment of the present invention. As illustrated, the receiver system 10 includes: an antenna 12, a receiver front end 14, a channel estimation unit 16, a noise estimation unit 18, a noise spectrum classification unit 20, a noise flattening filter 22, and an equalizer 24. The antenna 12 receives a communication signal 28 from a wireless communication channel. The receiver front end 14 processes the received communication signal 28 and converts it to a baseband representation R(n). The channel estimation unit 16 uses the received signal (either before, during, or after front end processing) to determine an estimated impulse response of the channel h'(n) (where the symbol ' is used to signify an estimated response). The noise estimation unit 18 uses the baseband signal R(n) and the estimated channel response h'(n) to determine an estimated noise spectrum η'(n) within the channel. The noise spectrum classification unit 20 analyzes the estimated noise spectrum η'(n) to determine a class of noise that is currently within the channel. The noise spectrum classification unit 20 then delivers a filter select signal to the noise flattening filter 22 that corresponds to the noise classification.

The noise flattening filter 22 has a variable filter response that changes in response to the filter select signal received from the noise spectrum classification unit 20. In this manner, the response of the noise flattening filter 22 adapts to the present noise classification of the channel. The noise flattening filter 22 filters the receive signal R(n) using the selected filter response to generate a filtered signal $R_f(n)$ having a whitened noise component. The filtered signal $R_f(n)$ is then delivered to the equalizer 24 which extracts data from the signal using a corresponding equalization technique. Because the noise within the receive signal has been whitened, the performance of the equalizer 24 is enhanced. It should be appreciated that the individual blocks illustrated in FIG. 1 (and in other block diagrams herein) do not necessarily correspond to discrete hardware elements. For example, one or more (or all) of the blocks may be implemented in software within a digital processing device (or within multiple digital processing devices).

The channel estimation unit 16 can use any of a plurality of known techniques to perform the channel estimation. Such techniques include, for example, the Maximum Likelihood Estimator (MLE), the Least Square Estimator (LSE), the Minimum Mean Square Estimator (MMSE), the Maximum A Posteriori (MAP) Estimator, and others. The noise estimation unit 18, as described above, uses the channel estimate to estimate the present noise spectrum in the channel. In one approach, for example, a linear channel model is used to perform the noise estimation. In the linear model, the receive signal R(n) is expressed as:

$$R(n)=S(n)h(n)+\eta(n)$$

where S(n) is the transmitted signal, h(n) is the impulse response of the channel, η(n) is the additive noise of the channel, and is the convolution operator. Based on this equation, the estimated noise η'(n) within a linear channel can be calculated as follows:

$$\eta'(n)=R(n)-S'(n)h'(n)$$

where S'(n) is the estimated transmitted signal data and h'(n) is the channel estimate generated by the channel estimation unit 16. In one approach, the communication signal 28 received from the channel includes some data that is known within the receiver 10. This can include, for example, a SYNC word that is included within the transmit data. The noise estimation unit 18 uses this known data (e.g., the SYNC word) as S'(n) in the above equation to calculate the noise estimate η'(n). In another approach, a preliminary data detection operation is performed to detect data within the received signal R(n). This detected data is then used as S'(n) in the above equation. It should be appreciated that other channel models (e.g., non-linear models) can alternatively be used to calculate the estimated noise η'(n). The channel model used will typically depend upon the expected characteristics of the channel of interest.

The noise spectrum classification unit 20 analyzes the noise estimate generated by the noise estimation unit 18 to classify the channel noise. In one approach, the noise spectrum classification unit 20 selects one of a finite number of predetermined noise classifications based on its analysis. A filter select signal corresponding to the selected noise classification is then output to the noise flattening filter 22. In one embodiment, the noise spectrum classification unit 20 classifies the channel noise based upon filtered noise power. A number of filter responses $h_{classi}(n)$ ($1 \leq i \leq K$) are defined that each isolate a different region within a spectrum of interest. The filter responses are used to determine a filtered noise power for each of the spectral regions as follows:

$$P_i = \frac{1}{N}\sum_{n=1}^{N}|\eta'(n) \otimes h_{classi}(n)|^2$$

where $h_{classi}(n)$ is the ith filter response, $P_i$ is the noise power corresponding to the ith filter response, and η'(n) is the estimated noise spectrum. Once the filtered noise powers $P_i$ have been calculated, they are compared to one another to determine the appropriate noise classification. For example, assume that two filter responses ($h_{class1}$ and $h_{class2}$) are used (i.e., K=2) to determine filtered noise powers within a system. The first filter response $h_{class1}$ defines a low pass filter (LPF) and the second filter response $h_{class2}$ defines a high pass filter (HPF). Two filtered noise powers ($P_1$ and $P_2$) are calculated using the two filter responses and a ratio of the two powers is calculated. The ratio is then used to determine the noise classification. If the ratio is greater than 10 dB, for example, a first classification can be selected. If the ratio is between 10 dB and −10 dB, a second noise classification can be selected. If the ratio is less than −10 dB, a third noise classification can be selected.

If the first noise classification is selected (i.e., $P_1/P_2 > 10$ dB), then the noise power in the channel is concentrated within the lower frequencies. A filter select signal is then delivered to the noise flattening filter 22 that selects a high pass filter response. If the third noise classification is selected (i.e., $P_1/P_2 < 10$ dB), the noise power in the channel is concentrated within the higher frequencies. A filter select signal is then delivered to the noise flattening filter 22 that selects a low pass filter response. If the second noise classification is selected (i.e., $-10 \text{ dB} \leq P_1/P_2 \leq 10 \text{ dB}$), the noise power in the channel is relatively balanced between lower and higher frequencies and a filter select signal is delivered to the noise flattening filter 22 that selects a bypass filter response.

Figure 2:
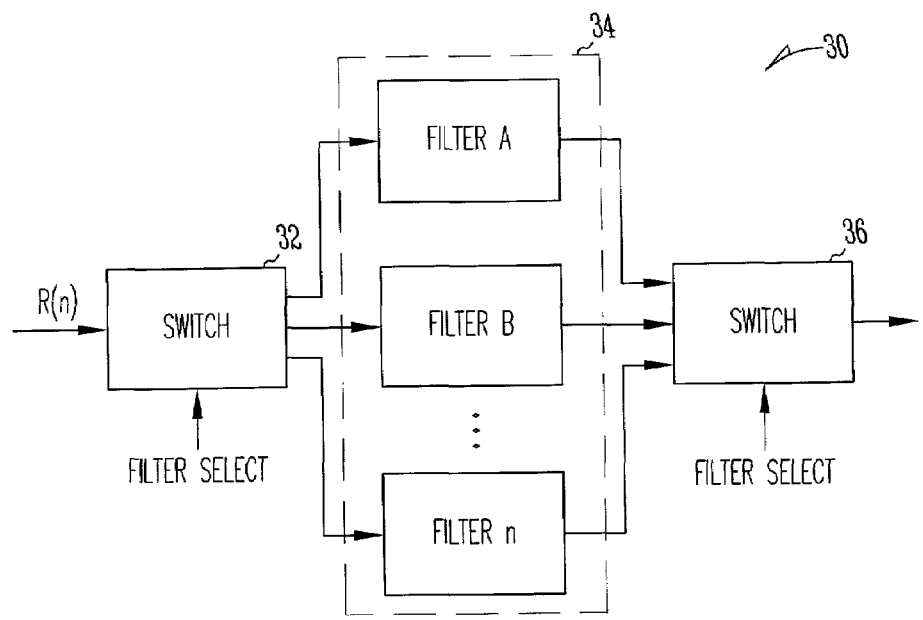
FIG. 2 is a block diagram illustrating a noise flattening filter in accordance with one embodiment of the present invention.

FIG. 2 is a block diagram illustrating a noise flattening filter 30 in accordance with one embodiment of the present invention. The noise flattening filter 30 can be used, for example, in the receiver system 10 of FIG. 1. As illustrated, the noise flattening filter 30 includes a switch 32 and a bank of filters 34. The bank of filters 34 includes a number of individual filters (i.e., FILTER A, FILTER B, etc.) that each have a unique filter response. Preferably, the filter response of each of the individual filters will correspond to a particular noise classification of the channel. The switch 32 is operative for directing the receive signal R(n) to one of the filters within the filter bank 34 based on the filter select signal received from the noise spectrum classification unit 20. The selected filter processes the signal R(n) while the other filters within the filter bank 34 are inactive. The filtered signal R'(n) is then delivered to the equalizer 24 for further processing. A second switch 36, or similar device, may be provided at the output of the filter bank 34 to select the output of the appropriate filter for delivery to the equalizer 24. The individual filters within the filter bank 34 can be any type of digital filter (e.g., finite impulse response, infinite impulse response, etc.). Preferably, the individual filters will each have a relatively short impulse response so that they do not significantly increase the complexity of the equalizer 24 (e.g., the complexity of the equalizer 24 will typically be exponentially related to the length of the impulse response of the noise flattening filter). In a preferred approach, the filter taps are calculated offline to give the best noise flatness within the filter length constraint.

Figure 3:
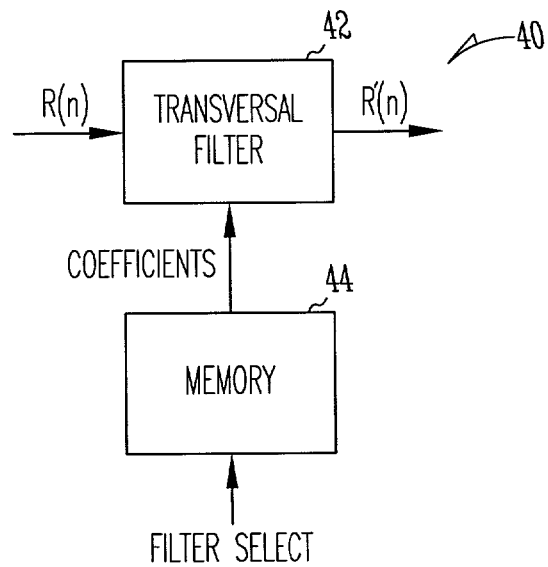
FIG. 3 is a block diagram illustrating a noise flattening filter in accordance with another embodiment of the present invention.

FIG. 3 is a block diagram illustrating another noise flattening filter configuration 40 that can be used within the receiver system 10 of FIG. 1. As shown, a single transversal filter 42 is used to filter the receive signal R(n). The response of the transversal filter 42 is dynamically adjusted during receiver operation by varying the tap weights of the filter. A memory 44 is provided that includes tap weight sets corresponding to a number of different filter responses. The filter select signal generated by the noise spectrum classification unit 20 (or a derivative thereof) is used to address the memory 44 so that the appropriate tap weights are applied to the transversal filter 42 based on the present noise classification. As before, after the receive signal has been filtered, the resulting signal is delivered to the equalizer 24 for further processing. It should be appreciated that many alternative noise flattening filter strategies can be used in accordance with the present invention, including adjustable filter arrangements that are implemented solely in software.

Figure 4:
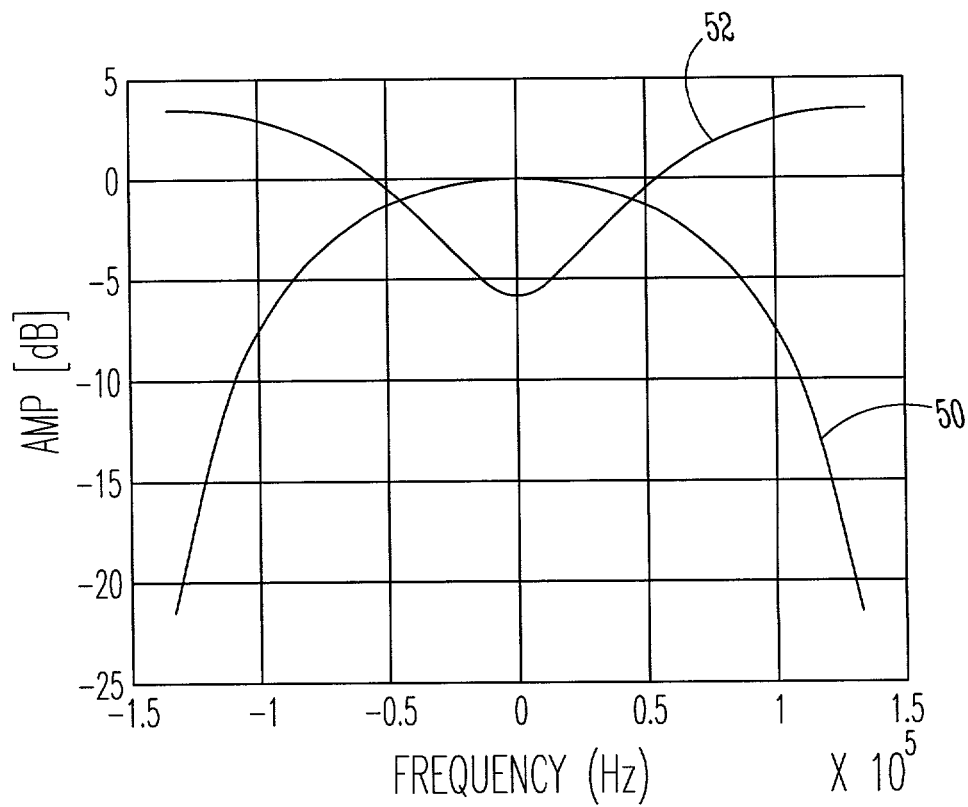
FIG. 4 is a graph illustrating a high pass filter response and a low pass filter response that can be used in a noise flattening filter in accordance with the present invention.

FIG. 4 is a graph illustrating two filter responses that can be used within the noise flattening filter 22 of FIG. 1; that is, a low pass filter (LPF) response 50 and a high pass filter response 52. Each of the filter responses 50, 52 has a length of two. Thus, these responses will each increase the effective response length of the channel by 1. As described previously, when the noise power in the channel is concentrated within the lower frequencies, the high pass filter response 52 can be selected for use within the noise flattening filter 22. Similarly, when the noise power in the channel is concentrated within the higher frequencies, the low pass filter response 52 can be selected for use within the noise flattening filter 22. Because the filter lengths associated with the filter responses 50, 52 are relatively low (i.e., 2), the noise flattening filter 22 will have minimal effect on the complexity of the equalizer 22.

Figure 5:
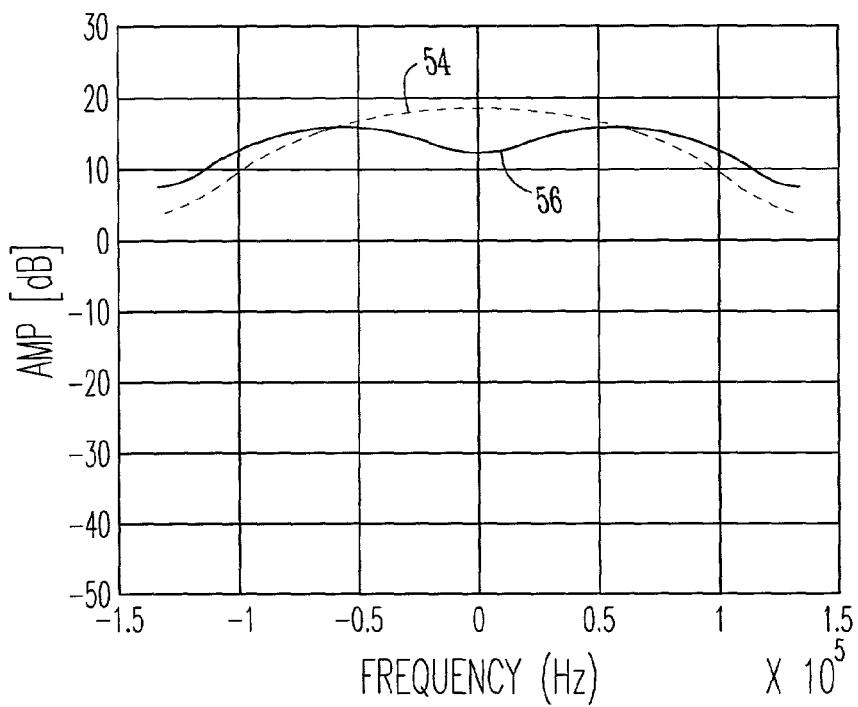
FIG. 5 is a spectrum diagram illustrating the whitening of a noise spectrum for a channel having co-channel noise.
Figure 6:
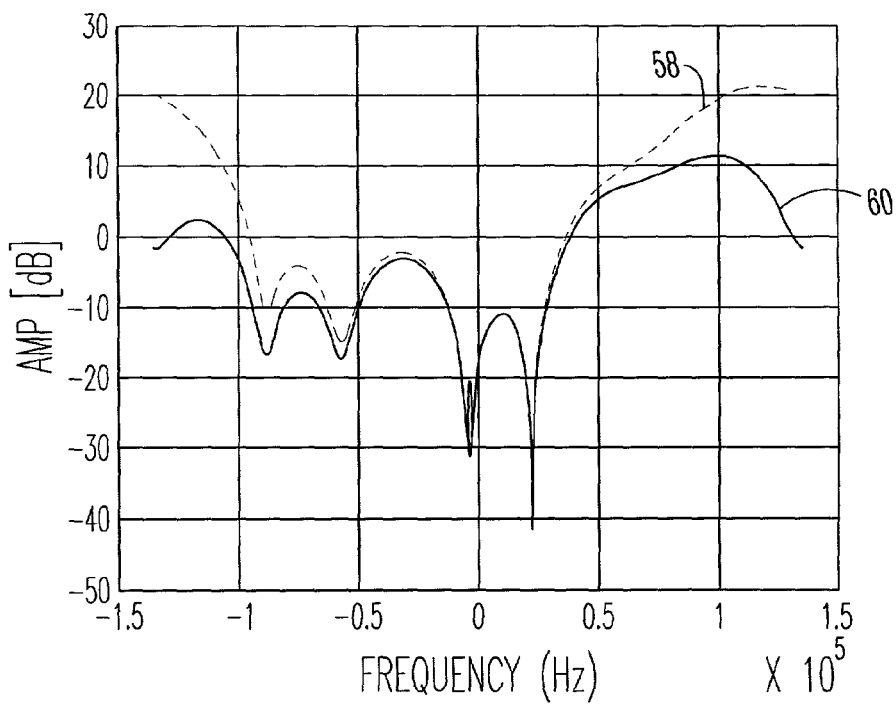
FIG. 6 is a spectrum diagram illustrating the whitening of a noise spectrum for a channel having adjacent channel noise.

In one application, the inventive principles are used to reduce the negative effects of co-channel and adjacent channel noise within a receiver (e.g., the receiver 10 of FIG. 1). Co-channel noise is noise resulting from other transmissions within a frequency channel of interest. Adjacent channel noise is noise resulting from transmissions within frequency channels that are adjacent to a channel of interest. Both types of noise can seriously compromise the performance of an equalizer. FIG. 5 is a spectrum diagram illustrating a noise spectrum 54 that may exist in a wireless channel that includes co-channel noise. As shown, the noise power is concentrated within the low frequency region of the spectrum (i.e., the region about zero frequency). To whiten this noise spectrum 54, a high pass filter response (e.g., filter response 52 of FIG. 4) is used within the noise flattening filter 22 to process the receive signal. With reference to FIG. 5, this will result in a flattened noise spectrum 56. FIG. 6 is a spectrum diagram illustrating a noise spectrum 58 that may exist in a wireless channel that includes adjacent channel noise. As shown, the noise power is concentrated within the high frequency region of the spectrum. To whiten this noise spectrum, a low pass filter response (e.g., low pass response 50 of FIG. 4) is used within the noise flattening filter 22 to process the receive signal. As shown in FIG. 6, this will result in flattened noise spectrum 60.

In a communication system implementing the Global System for Mobile Communication (GSM) standard or the Enhanced Data GSM Environment (EDGE) standard, the adjacent channel noise will typically have an offset of about 200 kHz from the frequency of interest. Thus, the low pass filter response used to whiten a noise spectrum including such adjacent channel noise would be designed based on this offset. Although the flattened noise spectrums 56, 60 of FIGS. 5 and 6, respectively, are not perfectly flat, the improvement in flatness generated by the noise flattening filter 22 will often have a significant impact on the performance of the equalizer 24. Even better flatness can typically be achieved by using a noise flattening filter with a longer impulse response. However, as described above, a longer impulse response will typically require an increase in the complexity of the equalizer 24, which may be undesirable. For a sub-optimal equalizer (e.g., a decision feedback equalizer (DFE)), the filter response may be selected based upon the equalizer algorithm. For example, when using a DFE, it is preferable to have a strong first tap in the impulse response.

It should be appreciated that any number of different noise spectrum classifications can be used in accordance with the present invention. Each classification will preferably have a filter response associated with it that is designed to provide optimal noise flattening for that class of noise within the length constraints of the filter. In one embodiment, for example, multiple LPF responses and multiple HPF responses are provided within a noise flattening filter in addition to a bypass filter response. Many other noise flattening filter configurations can also be used. The adaptation rate of the noise flattening filter will typically depend upon the time varying nature of the noise or interference. In one embodiment, filter updates are performed on a block by block basis (i.e., the noise spectrum is classified and the noise flattening filter response potentially modified for each data block received by the system). In another embodiment, updates are performed every several blocks. Adjustable adaptation rates are also possible. For example, updates can be performed more frequently during periods when the probability of interference is higher (e.g., more frequent updates during the daytime than at nighttime).

There are some equalizers that are optimized for use with colored noise. In a system using such an equalizer, the noise flattening filter 22 of FIG. 1 would be replaced by a filter that is configured to achieve the appropriate colored noise spectrum at the input of the equalizer 24. Operation would otherwise be similar to that described above.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A communication device for use in a wireless communication system comprising:
   a receiver front end to receive a communication signal from a wireless channel;
   a noise classification unit to determine a present noise classification for the wireless channel based on the received communication signal;
   an adjustable noise flattening filter to filter the communication signal received from the wireless channel to generate a filtered signal, said adjustable noise flattening filter having a filter response that is responsive to the noise classification determined by the noise classification unit; and
   an equalizer to process the filtered signal generated by the adjustable noise flattening filter.

2. The communication device of claim 1, comprising:
   a noise estimation unit to determine a noise estimate for the wireless channel using the received communication signal, wherein said noise classification unit uses said noise estimate to determine said present noise classification.

3. The communication device of claim 2, comprising:
   a channel estimation unit to determine an estimated channel response of the wireless channel using the received communication signal, wherein said noise estimation unit uses the estimated channel response to determine said noise estimate.

4. The communication device of claim 1, wherein:
   said adjustable noise flattening filter includes a plurality of individual filters that each have a different filter response.

5. The communication device of claim 4, wherein:
   said plurality of individual filters each correspond to a different noise classification.

6. The communication device of claim 4, wherein:
   said adjustable noise flattening filter includes an input for receiving a signal to be filtered, an output for outputting a filtered signal, and a switch for selectively switching one of said plurality of individual filters into a flow path between said input and said output in response to the noise classification determined by the noise classification unit.

7. The communication device of claim 1, wherein:
said adjustable noise flattening filter includes a single filter having a modifiable filter response.

8. A communication device comprising:
means for receiving a communication signal from a wireless communication channel;
means for estimating a noise spectrum within the wireless communication channel using the communication signal;
means for selecting a noise flattening filter response based on said noise spectrum estimated by said means for estimating; and
means for filtering the communication signal using the filter response selected by said means for selecting.

9. The communication device of claim 8, wherein:
said means for estimating a noise spectrum uses an estimated channel response to estimate said noise spectrum.

10. The communication device of claim 8, wherein:
said means for filtering includes a bank of individual filters and a switch for directing said communication signal to one of said individual filters based on a control signal.

11. The communication device of claim 8, wherein:
said means for selecting a noise flattening filter response includes means for calculating filtered noise powers using said noise spectrum estimated by said means for estimating.

12. The communication device of claim 8, wherein:
said means for selecting a noise flattening filter response includes means for selecting one of a finite number of predetermined filter responses based on said noise spectrum estimated by said means for estimating.

13. A method for processing a communication signal comprising:
receiving a communication signal from a wireless channel;
estimating a noise spectrum within said wireless channel using said communication signal;
selecting one of a plurality of filter responses to filter said communication signal based on said estimated noise spectrum;
filtering said communication signal using said selected filter response to generate a filtered communication signal having a noise component that is flatter than a noise component of said communication signal; and
applying said filtered communication signal to the input of an equalizer.

14. The method of claim 13, wherein:
estimating a noise spectrum includes:
convolving an estimated channel response with data known to be within said communication signal to generate an estimated signal; and
subtracting said estimated signal from the received communication signal to generate said estimated noise spectrum.

15. The method of claim 13, wherein:
selecting one of a plurality of filter responses includes:
analyzing said estimated noise spectrum to determine a noise classification for noise within the channel; and
generating a filter select signal based upon said noise classification.

16. The method of claim 15, wherein:
filtering said communication signal includes directing said communication signal to the input of one filter within a bank of filters based on said filter select signal.

17. The method of claim 13, wherein:
selecting one of a plurality of filter responses includes choosing a filter response that will most effectively flatten noise within said communication signal.

18. The method of claim 13, wherein:
said plurality of filter responses includes at least one high pass filter response and at least one low pass filter response.

19. A computer readable medium having program instructions stored thereon for implementing a method for filtering a communication signal when executed within a digital processing device, said method comprising:
analyzing a communication signal received from a wireless communication channel to determine a class of noise in the wireless communication channel;
selecting one of a plurality of filter responses to filter said communication signal based on said class of noise; and
filtering said communication signal using said selected filter response.

20. The computer readable medium of claim 19, wherein:
analyzing a communication signal includes estimating a noise spectrum within said channel.

21. The computer readable medium of claim 20, wherein:
analyzing a communication signal includes calculating filtered noise powers using said estimated noise spectrum.

22. The computer readable medium of claim 21, wherein:
analyzing a communication signal includes comparing said filtered noise powers to one another.

23. The computer readable medium of claim 19, wherein:
selecting one of a plurality of filter responses includes choosing a filter response that will most effectively flatten noise within said communication signal.

* * * * *